United States Patent
Chen et al.

(10) Patent No.: US 8,228,451 B2
(45) Date of Patent: Jul. 24, 2012

(54) LIQUID CRYSTAL DISPLAY

(75) Inventors: Po-Yang Chen, Taipei (TW); Po-Sheng Shih, Taipei (TW)

(73) Assignee: Hannstar Display Corporation, New Taipei (TW)

( * ) Notice: Subject to any disclaimer, the term of this patent is extended or adjusted under 35 U.S.C. 154(b) by 0 days.

(21) Appl. No.: 13/353,297

(22) Filed: Jan. 18, 2012

(65) Prior Publication Data

US 2012/0113342 A1     May 10, 2012

Related U.S. Application Data

(62) Division of application No. 12/563,158, filed on Sep. 20, 2009.

(30) Foreign Application Priority Data

Oct. 3, 2008   (TW) ............................... 97138268 A

(51) Int. Cl.
  *G02F 1/1343* (2006.01)
  *G06F 3/038* (2006.01)
(52) U.S. Cl. .......................................... 349/38; 345/95
(58) Field of Classification Search .................. 349/38; 345/95
  See application file for complete search history.

(56) References Cited

U.S. PATENT DOCUMENTS

| | | | |
|---|---|---|---|
| 5,923,310 A | 7/1999 | Kim | |
| 7,250,991 B2 * | 7/2007 | Nagata et al. | 349/38 |
| 2009/0115750 A1 * | 5/2009 | Chen et al. | 345/204 |

OTHER PUBLICATIONS

"Office Action of America Parent Application, U.S. Appl. No. 12/563,158", issued on Mar. 8, 2012, p1-p12, in which the listed reference was cited.

* cited by examiner

*Primary Examiner* — Eric Wong
(74) *Attorney, Agent, or Firm* — Jianq Chyun IP Office

(57) ABSTRACT

A liquid crystal display is provided. A pixel of the liquid crystal display includes a first pixel capacitor, a second pixel capacitor, a first transistor, and a second transistor. A first terminal and a second terminal of the first pixel capacitor are respectively coupled to the first transistor and a common voltage. A first terminal and a second terminal of the second pixel capacitor are respectively coupled to the second transistor and the common voltage. A voltage between the first and the second terminals of the first capacitor is differentiated from a voltage between the first and the second terminals of the second capacitor by modulating the common voltage. A coupling voltage of the first pixel capacitor is differentiated from a coupling voltage of the second pixel capacitor by modulating the common voltage. Thereby, the phenomenon of color wash-out is reduced.

14 Claims, 14 Drawing Sheets

LIQUID CRYSTAL DISPLAY

CROSS-REFERENCE TO RELATED APPLICATION

This is a divisional application of and claims priority benefit of an U.S. application Ser. No. 12/563,158, filed on Sept. 20, 2009, which claims the priority benefit of Taiwan application serial no. 97138268, filed on Oct. 3, 2008. The entirety of the above-mentioned patent applications is hereby incorporated by reference herein and made a part of specification.

BACKGROUND OF THE INVENTION

1. Field of the Invention

The present invention relates to a liquid crystal display, and particularly to a half-tone technology of a liquid crystal display.

2. Description of Related Art

When it comes to the wide-viewing-angle technology of liquid crystal display (LCD), a vertically aligned mode (VA mode) color LCD is considered as the most popular type at present. However, when a VA mode color LCD is viewed in an oblique direction, the skin color of Asians on the screen may tend to be blue or white. Such a phenomenon is called color wash-out. FIGS. 1A and 1B illustrate transmittance-voltage diagrams of a VA mode color LCD, wherein the vertical axis represents the transmittance and the horizontal axis represents the voltage applied. When the voltage increases, the transmittance of the perpendicular-viewing-angle curve 102 increases as well which shows a monotonic function, but the transmittance of the voltages have almost the same transmittance. This problem, which results in color wash-out, only occurs on VA mode color LCDs. In order to solve this problem, H. Yoshidaet et al. from Fujitsu Display Technologies Corporation have developed an improvement, which is to divide one pixel unit into two different gamma characteristic curves, so as to form two areas having different transmittance-voltage characteristics for color mixture. This method is called half-tone technology. Referring to FIG. 1B, the curve 106 is a transmittance-voltage curve having low threshold voltage and the curve 108 is a transmittance-voltage curve having high threshold voltage. These curves can be mixed to form a monotonic transmittance-voltage curve 110 for eliminating the color wash-out phenomenon.

Please refer to FIGS. 2A and 2B. At present, half-tone technology is mainly categorized into two types, CC type and TT type. FIG. 2A illustrates the CC type and FIG. 2B illustrates the TT type. The basic principle is to divide the original pixel unit into two areas, a first sub-pixel and a second sub-pixel, which include different gamma characteristic curves, so as to realize the afore-mentioned half-tone technology and eliminate the color wash-out phenomenon. FIG. 2C illustrates a gamma characteristic curve of the CC type, and FIG. 2D illustrates a gamma characteristic curve of the TT type. Referring to FIG. 2C for example, under a gray-scale voltage, a mixed gamma characteristic curve of a pixel unit is the sum of the gamma characteristic curves of the first sub-pixel and the second sub-pixel.

As shown in FIG. 2A, a pixel unit is divided into two areas, and a capacitance dividing method is applied to generating a sub-pixel capacitor 208 and a sub-pixel capacitor 214 which have different gamma characteristic curves. Herein, the voltage of the sub-pixel capacitor 208 is directly written by a data line through a transistor 202. The voltage of the sub-pixel capacitor 214 is determined after the voltage of the data line is divided by a serially connected storage capacitor 210. In other words, the sub-pixel capacitor 214 is in a floating status and the voltage is decided by the coupling method. The voltage of the sub-pixel capacitor 214 may be shifted when electric charges are captured during the operation of the panel, which may result in the problems such as low reliability, non-uniform image, and residual image.

Referring to FIG. 2B, a pixel unit is divided into two areas, and two different gamma characteristic curves are directly assigned from the system to the sub-pixel capacitor 226 and the sub-pixel capacitor 228 through transistors 218 and 220, two scan lines, or two data lines. This is the most direct method, but this method has the shortcomings of reducing the aperture ratio, complicating the system circuit (an additional gamma characteristic curve is required), doubling gate line driving or data line driving, increasing power consumption, and so forth.

SUMMARY OF THE INVENTION

The present invention provides a liquid crystal display for improving a color wash-out phenomenon.

The present invention provides a driving method of liquid crystal display, which improves the color wash-out phenomenon by modulating a common voltage to differentiate a changed voltage of a first pixel capacitor from a changed voltage of a second pixel capacitor.

The present invention provides a driving method of liquid crystal display, which includes providing the common voltage to a common electrode in a first period and modulating the common voltage. In addition, a first terminal of a first transistor is coupled by the first pixel capacitor and a first terminal of a second transistor is coupled by the second pixel capacitor. Further, a changed voltage is generated between the first terminal of the first transistor and the first terminal of the second transistor.

From another aspect, the present invention provides a liquid crystal display including a substrate, an opposite substrate, a bias electrode, a common electrode, a first pixel electrode, a second pixel electrode, and a mutual electrode. The opposite substrate is corresponding to the substrate. The bias electrode and the common electrode are disposed on the substrate. The first pixel electrode overlaps the bias electrode and the common electrode to separately form a first storage capacitor having a capacitance $C_{st1}$ and a third storage capacitor having a capacitance $C_{st3}$. The second pixel electrode overlaps the bias electrode and the common electrode to separately form a second storage capacitor having a capacitance $C_{st2}$ and a fourth storage capacitor having a capacitance $C_{st4}$. The mutual electrode is disposed on the opposite substrate and respectively overlaps the first pixel electrode and the second pixel electrode to form a first pixel capacitor having a capacitance $C_{lc1}$ and a second pixel capacitor having a capacitance $C_{lc2}$. Herein, $$\frac{C_{st3}+C_{lc1}}{C_{st1}+C_{st3}+C_{lc1}} \neq \frac{C_{st4}+C_{lc2}}{C_{st2}+C_{st4}+C_{lc2}}.$$

The present invention differentiates the coupling voltage of the first pixel capacitor from the coupling voltage of the second pixel capacitor by modulating the common voltage, and thereby improves color wash-out.

To make the aforesaid features and advantages of the present invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 3A:
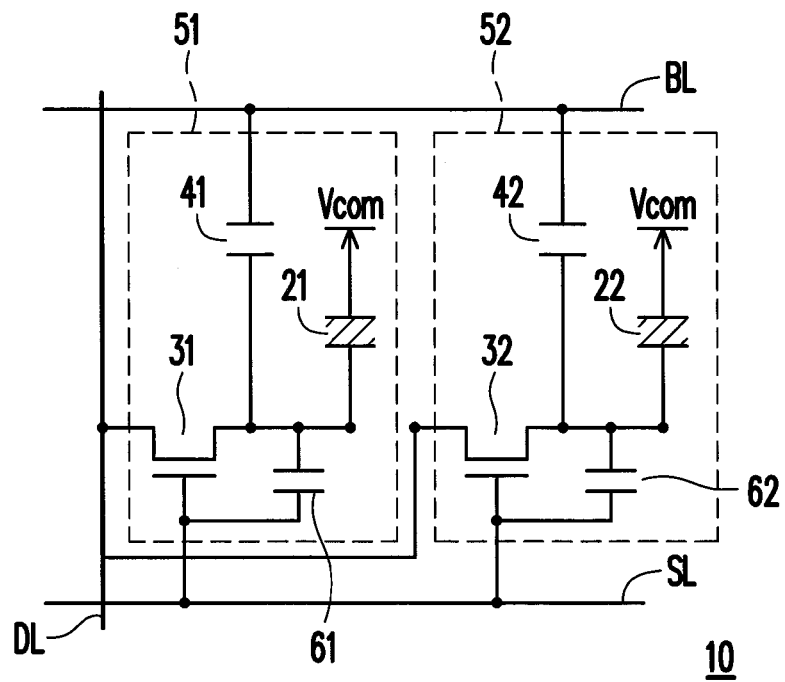
FIG. 3A illustrates a circuit diagram of a pixel of a LCD according to the first embodiment of the present invention.

FIG. 3A illustrates a circuit diagram of a pixel of a LCD according to the first embodiment of the present invention. A pixel 10 includes pixel capacitors 21 and 22, transistors 31 and 32, and storage capacitors 41 and 42. The second terminals of the pixel capacitors 21 and 22 are coupled to a mutual electrode, and the mutual electrode is coupled to a common voltage $V_{com}$. A first terminal, a second terminal, and a gate terminal of the transistor 31 are respectively coupled to a first terminal of the pixel capacitor 21, a data line DL, and a scan line SL. Further, a parasitical capacitor 61 exists between the first terminal and the gate terminal of the transistor 31. A first terminal, a second terminal, and a gate terminal of the transistor 32 are respectively coupled to a first terminal of the pixel capacitor 22, the data line DL, and the scan line SL. Moreover, a parasitical capacitor 62 exists between the first terminal and the gate terminal of the transistor 32.

In addition to the above, a first terminal and a second terminal of the storage capacitor 41 are respectively coupled to the first terminal of the pixel capacitor 21 and a bias line BL. A first terminal and a second terminal of the storage capacitor 42 are respectively coupled to the first terminal of the pixel capacitor 22 and the bias line BL. In this embodiment, the bias line BL is a scan line coupled to a pixel before the pixel 10. However, in other embodiments, the bias line BL may also be a second bias electrode.

Figure 3B:
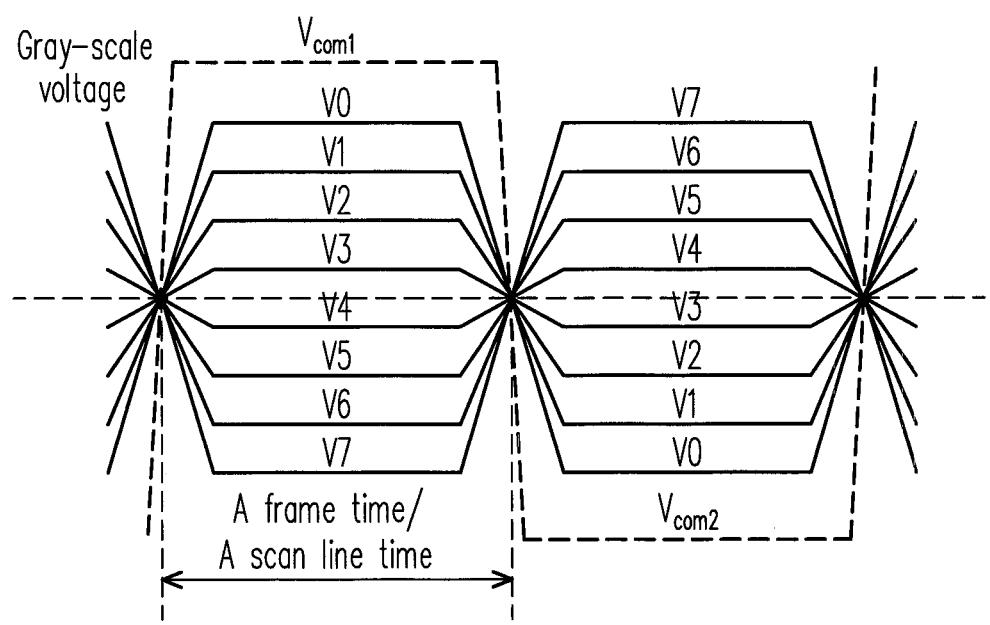
FIG. 3B illustrates a waveform diagram of a modulated common voltage $V_{com}$ according to the first embodiment of the present invention.

FIG. 3B illustrates a waveform diagram of a modulated common voltage $V_{com}$ according to the first embodiment of the present invention. In this embodiment, the common voltage $V_{com}$ is modulated to differentiate a changed voltage $V_{P1}$ (a voltage difference between the first terminal and the second terminal of the pixel capacitor 21) of the pixel capacitor 21 from a changed voltage $V_{P2}$ (a voltage difference between the first terminal and the second terminal of the pixel capacitor 22) of the pixel capacitor 22. Herein, the common voltage $V_{com}$ has two voltage levels, a high level $V_{com1}$ and a low level $V_{com2}$, for example.

For instance, the aforesaid modulated common voltage $V_{com}$ may be changed from the high level $V_{com1}$ to the low level $V_{com2}$ or changed from the low level $V_{com2}$ to the high level $V_{com1}$. Specifically, when the changed voltages $V_{P1}$ and $V_{P2}$ are positive to the common voltage $V_{com}$, the common voltage $V_{com}$ may be modulated from the high level $V_{com1}$ to the low level $V_{com2}$; on the contrary, when the changed voltages $\Delta V_{P1}$ and $\Delta V_{P2}$ are negative, the common voltage $V_{com}$ may be modulated from the low level $V_{com2}$ to the high level $V_{com1}$.

Figure 3C:
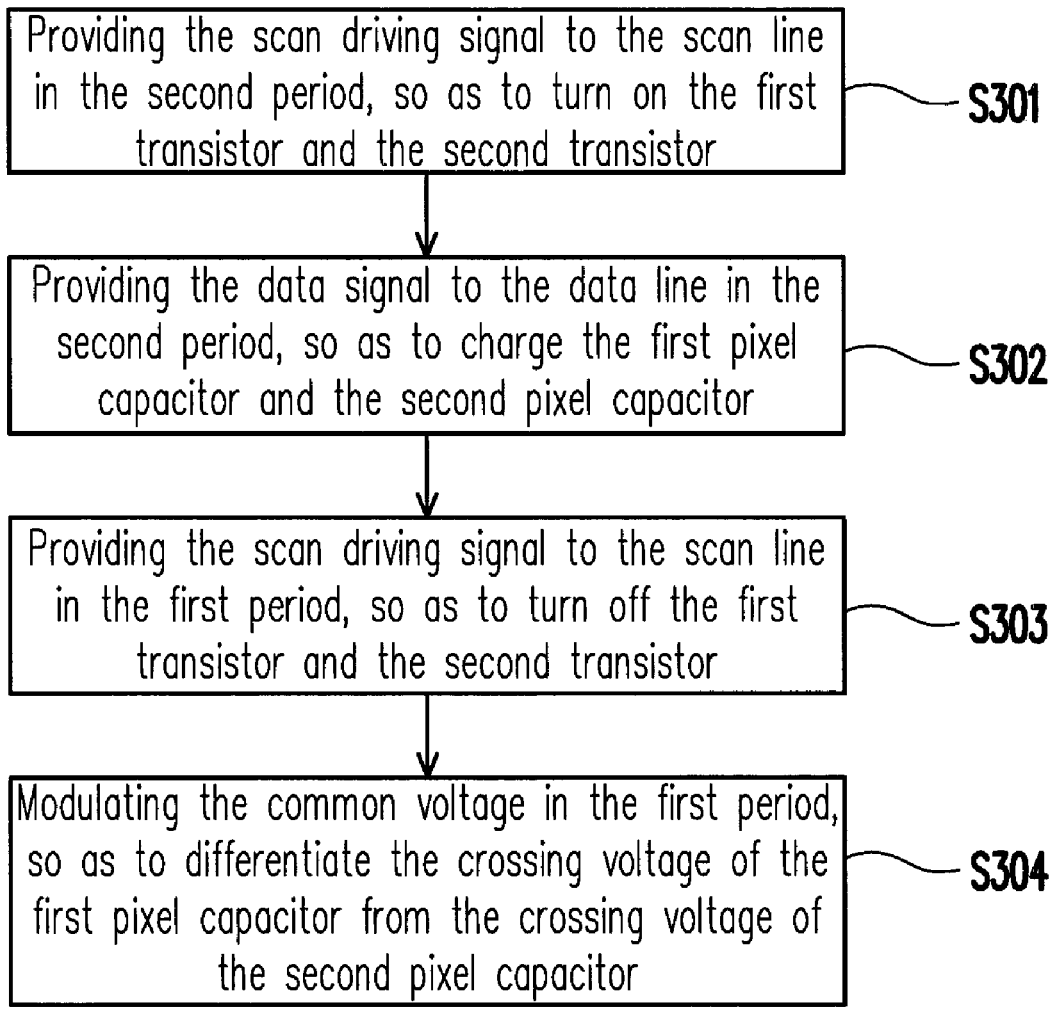
FIG. 3C is a process flow illustrating a driving method of a pixel according to the first embodiment of the present invention.
Figure 3D:
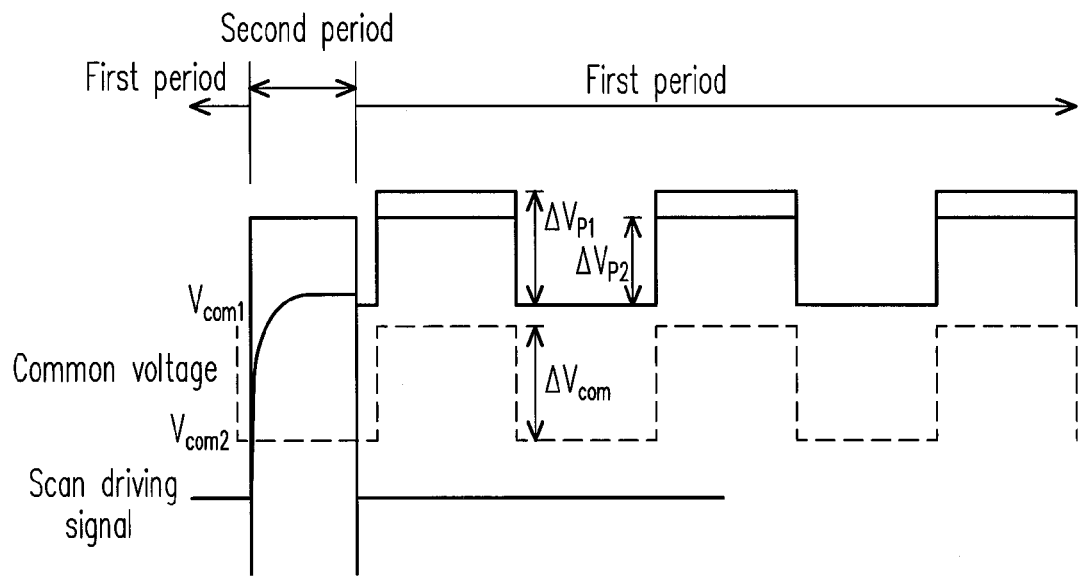
FIG. 3D illustrates a waveform diagram of a common voltage $V_{com}$, a changed voltage $\Delta V_{P1}$, and a changed voltage $\Delta V_{P2}$ of an even frame according to the first embodiment of the present invention.
Figure 3E:
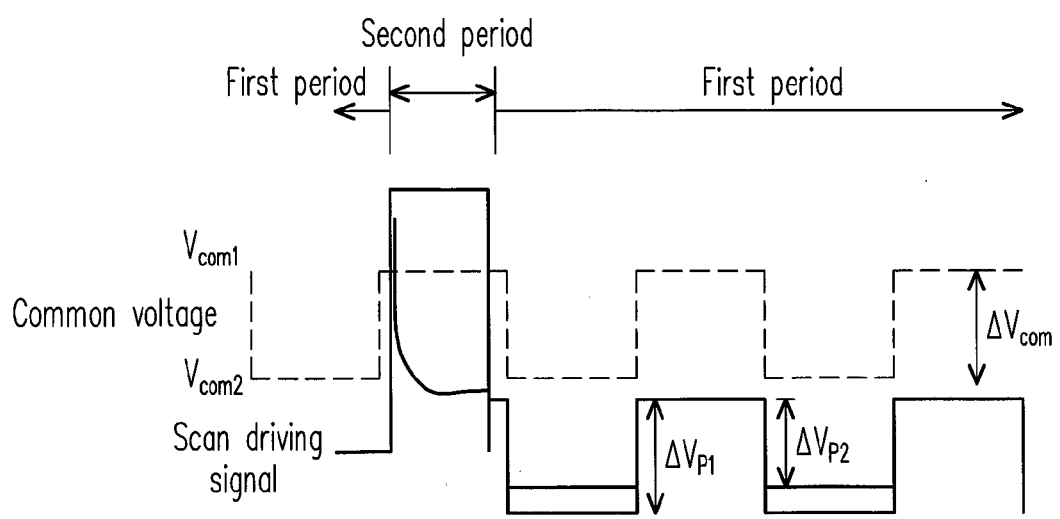
FIG. 3E illustrates a waveform diagram of a common voltage $V_{com}$, a changed voltage $\Delta V_{P1}$, and a changed voltage $\Delta V_{P2}$ of an odd frame according to the first embodiment of the present invention.

FIG. 3C is a process flow illustrating a driving method of a pixel according to the first embodiment of the present invention. FIG. 3D illustrates a waveform diagram of the common voltage $V_{com}$, the changed voltage $\Delta V_{P1}$ of the $V_{P1}$, and the changed voltage $\Delta V_{P2}$ of the $V_{P2}$ of an even frame according to the first embodiment of the present invention. FIG. 3E illustrates a waveform diagram of the common voltage $V_{com}$, the changed voltage $\Delta V_{P1}$ of the $V_{P1}$, and the changed voltage $\Delta V_{P2}$ of the $V_{P2}$ of an odd frame according to the first embodiment of the present invention. Referring to FIGS. 3A, 3C, 3D, and 3E, in this embodiment, the first terminal of the transistor 31 is electrically connected with the first terminal of the pixel capacitor 21, and the gate terminal of the transistor 31 is electrically connected with the scan line SL. The first terminal of the transistor 32 is electrically connected with the first terminal of the pixel capacitor 22, and the gate terminal of the transistor 32 is electrically connected with the scan line SL. In addition, the second terminal of the pixel capacitor 21 is electrically connected with the mutual electrode, and the second terminal of the pixel capacitor 22 is also electrically connected with the mutual electrode. Descriptions about the operation of each element in a second period are provided as follows.

In the second period, starting with Step S301, a high-level scan driving signal is provided to the scan line SL by a scan driving circuit of a LCD, so as to conduct the first and second terminals of the transistor 31 and conduct the first and second terminals of the transistor 32. Moreover, in Step S302, a data driving circuit of the LCD provides a data signal to the data line DL, so as to charge the pixel capacitors 21 and 22. Further, descriptions about the operation of each element in a first period are provided as follows.

In the first period, as shown in Step S303, a low-level scan driving signal is provided to the scan line SL by the scan driving circuit, so as to turn off the transistors 31 and 32, and thereby insulate the first and the second terminals of the transistor 31 and insulate the first and the second terminals of the transistor 32. Consequently, an interference between the voltages of the first terminals of the pixel capacitors 21 and 22 may be prevented. In addition, the voltages coupled to the two terminals of the pixel capacitors 21 and 22 are not floated voltages, and thus the conventional problem of residual image may be improved. f Furthermore, referring to Step S304, in the first period, the common voltage $V_{com}$ is modulated to differentiate the changed voltage $\Delta V_{P1}$ of the pixel capacitor 21 from the changed voltage $\Delta V_{P2}$ of the pixel capacitor 22. To be more specific, the common voltage $V_{com}$ may be provided to the mutual electrode and then modulated. Moreover, the pixel capacitor 21 is coupled to the first terminal of the transistor 31, and the pixel capacitor 22 is coupled to the first terminal of the transistor 32. Thereby, a changed voltage is generated between the first terminal of the transistor 31 and the first terminal of the transistor 32. That is to say, the sub-pixels 51 and 52 of the pixel 10 would have different "data signal-transmittance" curves.

In this embodiment, an even frame of the pixel 10 is, for example, driven as positive polarity, and an odd frame of the pixel 10 is driven as negative polarity. Herein, the changed voltages $\Delta P_{P1}$ and $\Delta V_{P2}$ may be obtained by the following formulas (I) and (II):

$$\Delta V_{p1} = \frac{C_{lc1}}{C_{st1} + C_{lc1} + C_{gs1}} \times \Delta V_{com} \quad \text{formula (I)}$$

$$\Delta V_{p2} = \frac{C_{lc2}}{C_{st2} + C_{lc2} + C_{gs2}} \times \Delta V_{com} \quad \text{formula (II)}$$

According to the formulas (I) and (II), $C_{lc1}$ and $C_{lc2}$ respectively represent the liquid crystal capacitances of the pixel capacitors 21 and 22, $C_{st1}$ and $C_{st2}$ represent the storage capacitances of the storage capacitors 41 and 42, $C_{gs1}$ and $C_{gs2}$ represent the parasitical capacitances of the parasitical capacitors 61 and 62, and $\Delta V_{com}$ ($V_{com1}-V_{com2}$ or $V_{com2}-V_{com1}$) is a modulating value of the common voltage $V_{com}$. Furthermore, the values of $C_{gs1}$ and $C_{gs2}$ are very small and may be neglected.

Figure 2A:
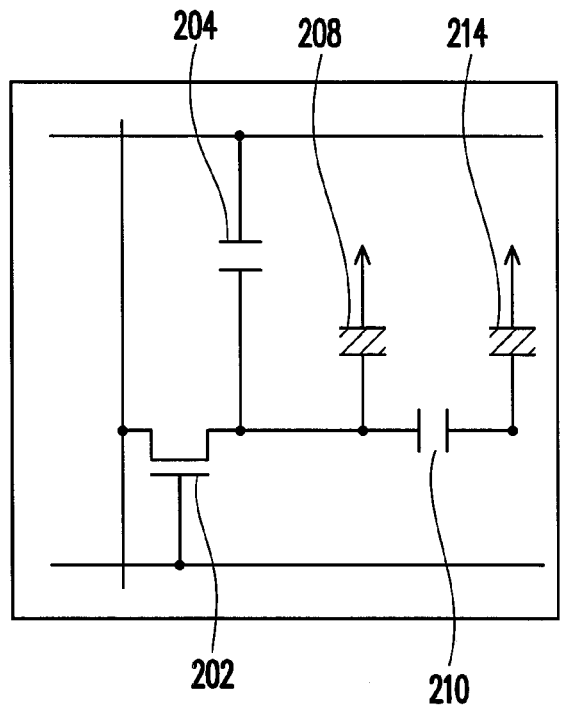
FIG. 2A illustrates a conventional CC type pixel unit.
Figure 2B:
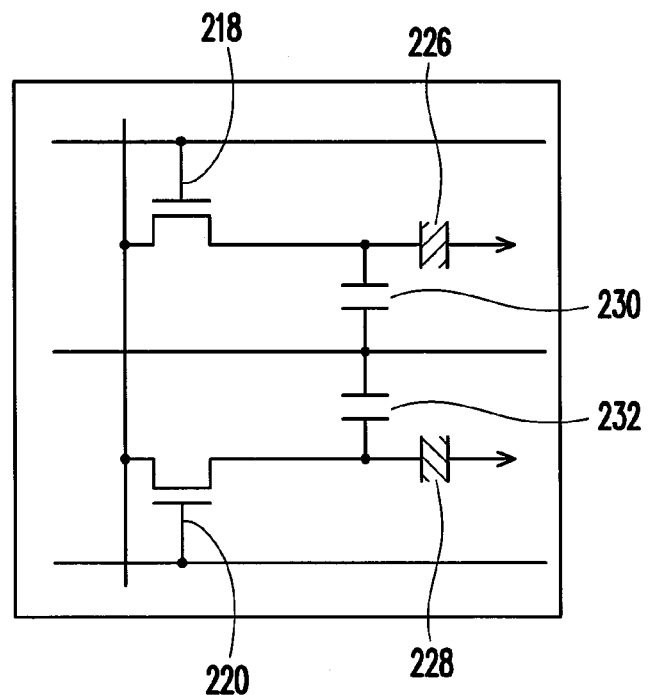
FIG. 2B illustrates a conventional TT type pixel unit.
Figure 2C:
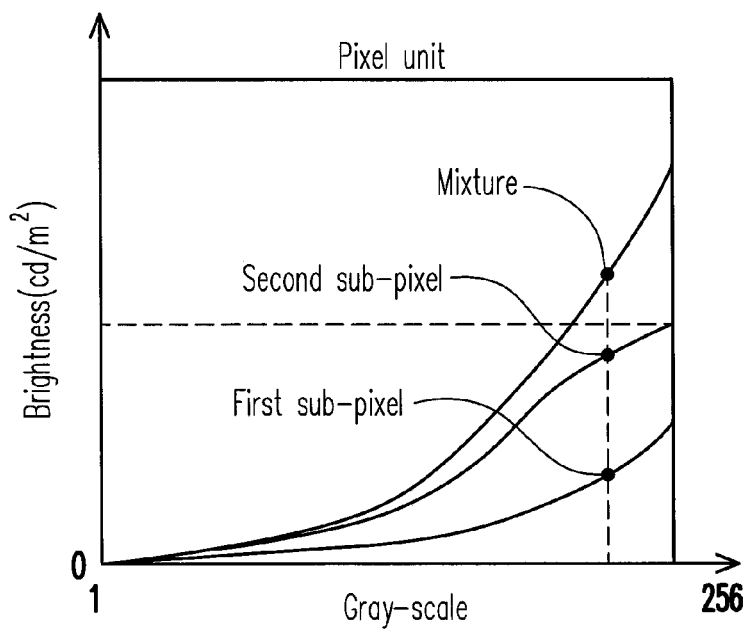
FIG. 2C illustrates a gamma characteristic curve diagram of a conventional CC type pixel unit.
Figure 2D:
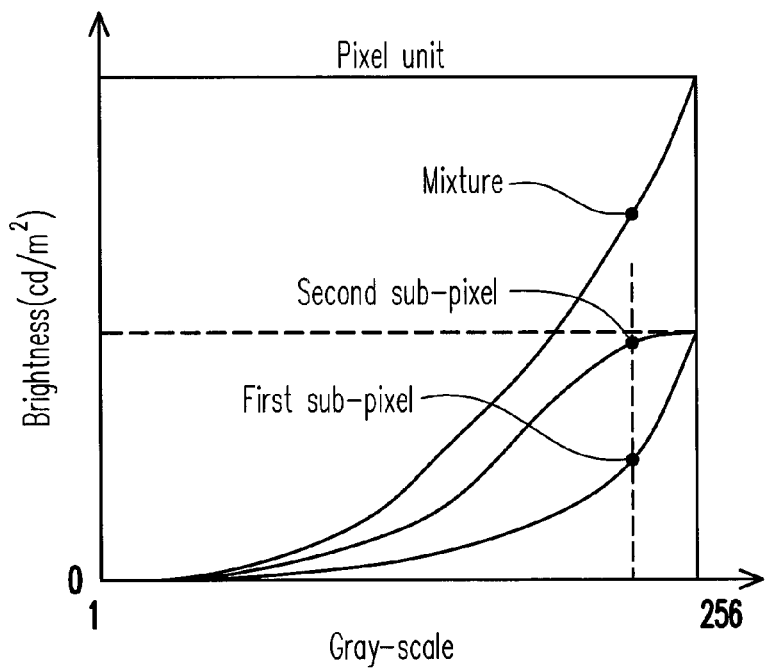
FIG. 2D illustrates a gamma characteristic curve diagram of a conventional TT type pixel unit.

Based on the above, in this embodiment, the pixel 10 may be designed as $C_{lc1}=C_{lc2}$ and $C_{st1} \neq C_{st2}$. Hence, by modulating the common voltage $V_{com}$ in Step S304, the changed voltage $\Delta V_{P1}$ is differentiated from the changed voltage $\Delta V_{P2}$. Accordingly, the sub-pixels 51 and 52 of the pixel 10 may have different "data signal-transmittance" curves to improve the problem of color wash-out. Additionally, unlike the conventional technology which requires the sub-pixels to be coupled to different scan lines, the sub-pixels 51 and 52 in this embodiment are coupled to the same scan line. What is more, upon comparison with the conventional technology in FIG. 2A, this embodiment not only enhances reliability but also helps to overcome the problems such as non-uniform image and residual image. When compared with FIG. 2B, this embodiment only uses half of the scan lines that are required in the conventional technology, which greatly reduces the costs of hardware, increases the aperture ratio, and simplifies the complexity of the system circuit without increasing the operation frequency of the circuit. Hence, the power consumption is low.

Although the pixel 10 in this embodiment is designed to be $C_{lc1}=C_{lc2}$ and $C_{st1} \neq C_{st2}$, the present invention is not limited thereto. In other embodiments, the common voltage $V_{com}$ may also be modulated, as in Step S304, to differentiate the changed voltage $\Delta V_{P1}$ from the changed voltage $\Delta V_{P2}$, as long as $C_{lc1}$, $C_{lc2}$, $C_{st1}$, and $C_{st2}$ satisfy the formula $$\frac{C_{lc1}}{C_{st1} + C_{lc1}} \neq \frac{C_{lc2}}{C_{st2} + C_{lc2}}.$$

Figure 4A:
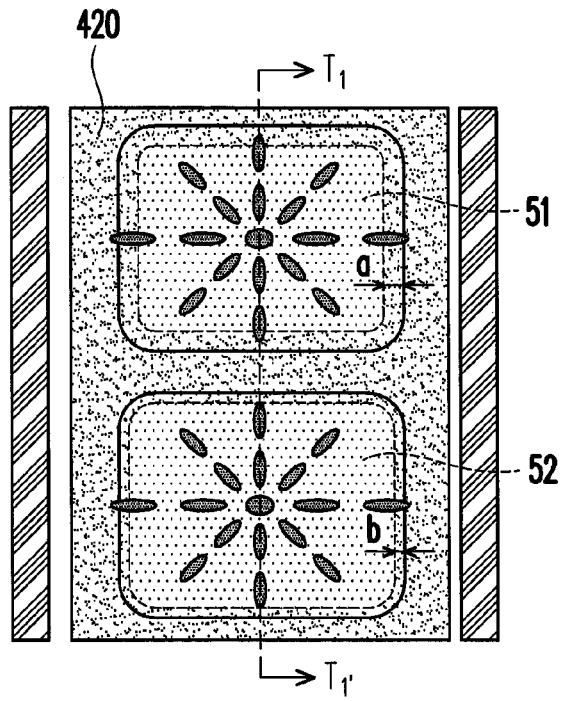
FIG. 4A illustrates a top view of the first pixel structure according to the first embodiment of the present invention.
Figure 4B:
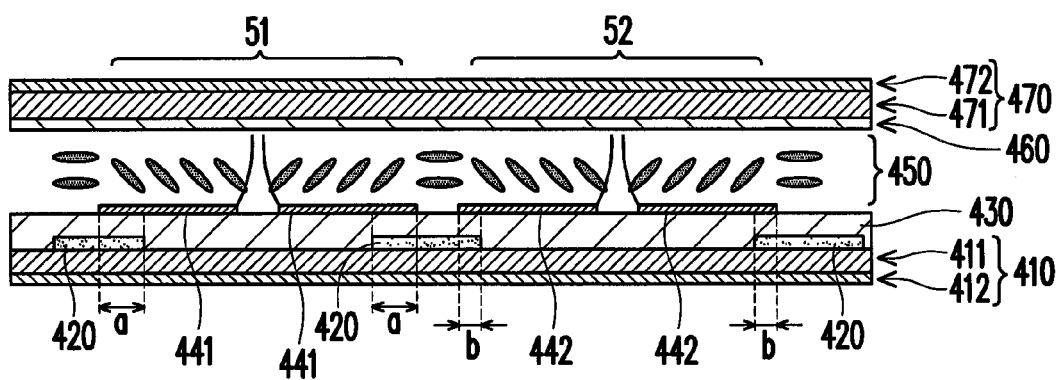
FIG. 4B illustrates a cross-sectional view along the line $T_1$-$T_{1'}$ in FIG. 4A.

FIG. 4A illustrates a top view of the first pixel structure according to the first embodiment of the present invention. FIG. 4B illustrates a cross-sectional view along the line $T_1$-$T_1'$ in FIG. 4A. Please refer to FIG. 3A together with FIGS. 4A and 4B. A structure of the pixel 10 includes a substrate 410, a bias electrode 420, a dielectric layer 430, pixel electrodes 441 and 442, a liquid crystal layer 450, and a mutual electrode 460. In this embodiment, the substrate 410 is for example formed by a bottom glass 411 and a polarizer 412. The bias electrode 420 is disposed on a portion of the substrate 410. For instance, the bias electrode 420 may be designed to have a plurality of openings, and each opening is arranged to correspond to the sub-pixels 51 and 52 respectively. The dielectric layer 430 is disposed on the bias electrode 420. The pixel electrode 441 is disposed on a portion of the dielectric layer 430, and a portion of the pixel electrode 441 overlaps a portion of the bias electrode 420 to form the storage capacitor 41. The pixel electrode 442 is disposed on a portion of the dielectric layer 430, and a portion of the pixel electrode 442 overlaps a portion of the bias electrode 420 to form the storage capacitor 42.

In this embodiment, the bias electrode 420, the pixel electrodes 441 and 442, and the mutual electrode 460 may be formed by an opaque material, such as aluminum. However, in other embodiments, the bias electrode 420, the pixel electrodes 441 and 442, and the mutual electrode 460 may also be formed by a transparent material, such as ITO.

Furthermore, the liquid crystal layer 450 is disposed on the pixel electrodes 441 and 442. The mutual electrode 460 is disposed on the liquid crystal layer 450 and corresponds to the pixel electrodes 441 and 442 to respectively form the pixel capacitors 21 and 22. In addition, the substrate 470 may be further disposed on the mutual electrode 460. The substrate 470, for example, includes the top glass 471 and the polarizer 472.

It is noted that an overlap area (a circular area having a width a) of the pixel electrode 441 and the bias electrode 420 is different from an overlap area (a circular area having a width b) of the pixel electrode 441 and the bias electrode 420. Consequently, the storage capacitance $C_{st1}$ of the storage capacitor 41 is different from the storage capacitance $C_{st2}$ of the storage capacitor 42. Moreover, in this embodiment, the area of the pixel electrode 441 and the area of the pixel electrode 442 are designed to be equal. Hence, the liquid crystal capacitance $C_{lc1}$ of the pixel capacitor 21 is equal to the liquid crystal capacitance $C_{lc2}$ of the pixel capacitor 22. Based on the above, the changed voltages of the pixel capacitors 21 and 22 would be different when the common voltage $V_{com}$ is modulated.

Figure 4C:
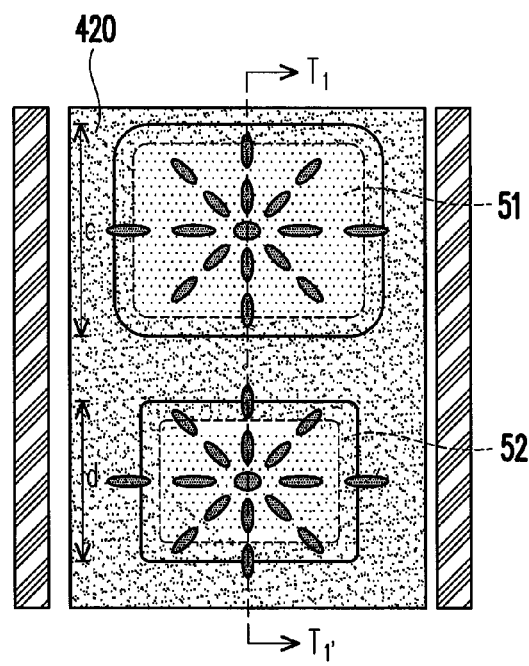
FIG. 4C illustrates a top view of the second pixel structure according to the first embodiment of the present invention.
Figure 4D:
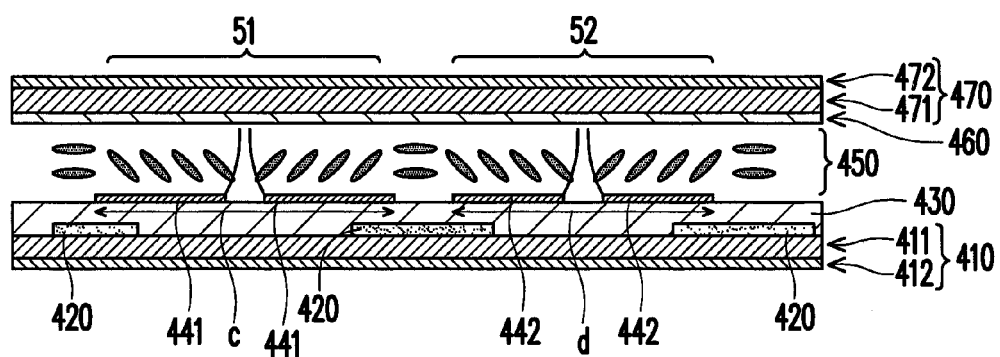
FIG. 4D illustrates a cross-sectional view along the line $T_1$-$T_{1'}$ in FIG. 4C.

Although the areas of the pixel electrodes 441 and 442 are the same in this embodiment, in another embodiment the areas of the pixel electrodes 441 and 442 may be designed to be unequal to achieve $C_{lc1} \neq C_{lc2}$. FIG. 4C illustrates a top view of the second pixel structure according to the first embodiment of the present invention. FIG. 4D illustrates a cross-sectional view along the line $T_1$-$T_{1'}$ in FIG. 4C. Persons having ordinary knowledge in the art may replace the pixel structure in Figs. A and B with the pixel structure in FIGS. 4C and 4D. It is noted that, c is greater than d in FIGS. 4C and 4D. That is, the area of the pixel electrode 441 is larger than the area of the pixel electrode 442, such that $C_{lc1} \neq C_{lc2}$.

Although the bias electrode 420 in this embodiment is formed by an opaque material having a plurality of openings, according to other embodiments the bias electrode 420 may also be formed by a transparent material having no openings or a transparent material having a plurality of openings.

Persons having ordinary knowledge in the art may design the pixel 10 to be a transmissive pixel, so as to fabricate a transmissive LCD. In addition, the pixel 10 may be designed as a reflective pixel for fabricating a reflective LCD. Furthermore, the sub-pixel 51 of the pixel 10 may be designed as a transmissive pixel and the sub-pixel 52 may be designed as a reflective pixel, so as to form a transflective LCD.

Second Embodiment

Figure 1A:
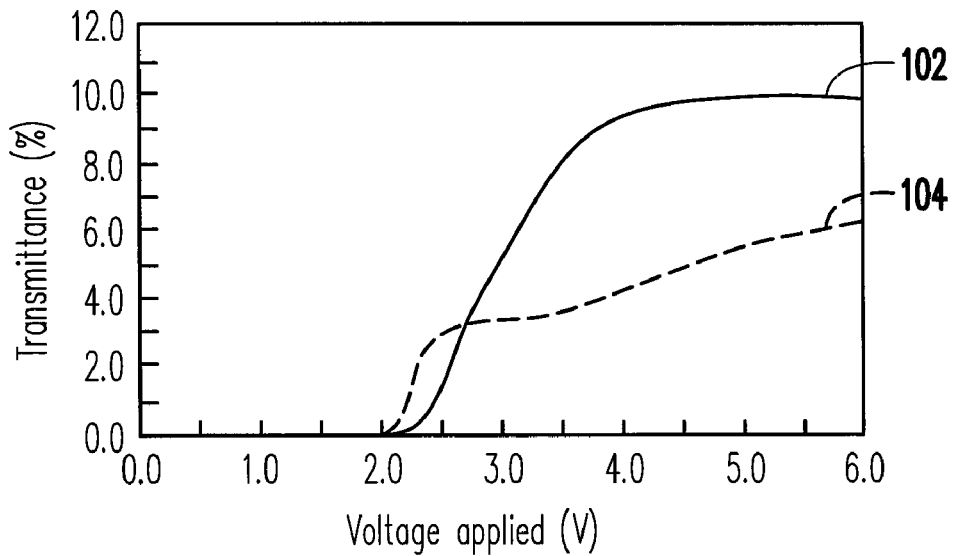
FIG. 1A illustrates a transmittance-voltage diagram of a VA mode color LCD.
Figure 1B:
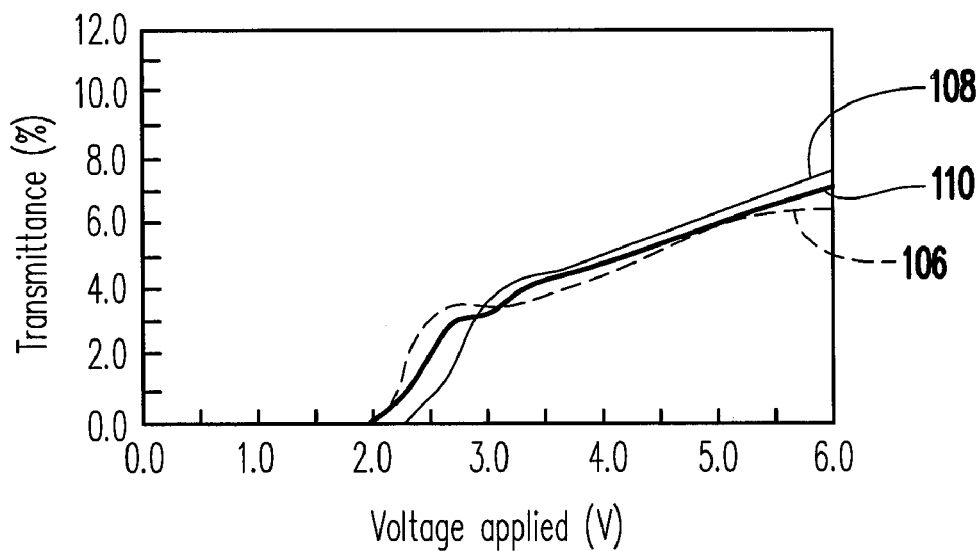
FIG. 1B illustrates a transmittance-voltage diagram, including two sets of gamma curves, of a VA mode color LCD.
Figure 5:
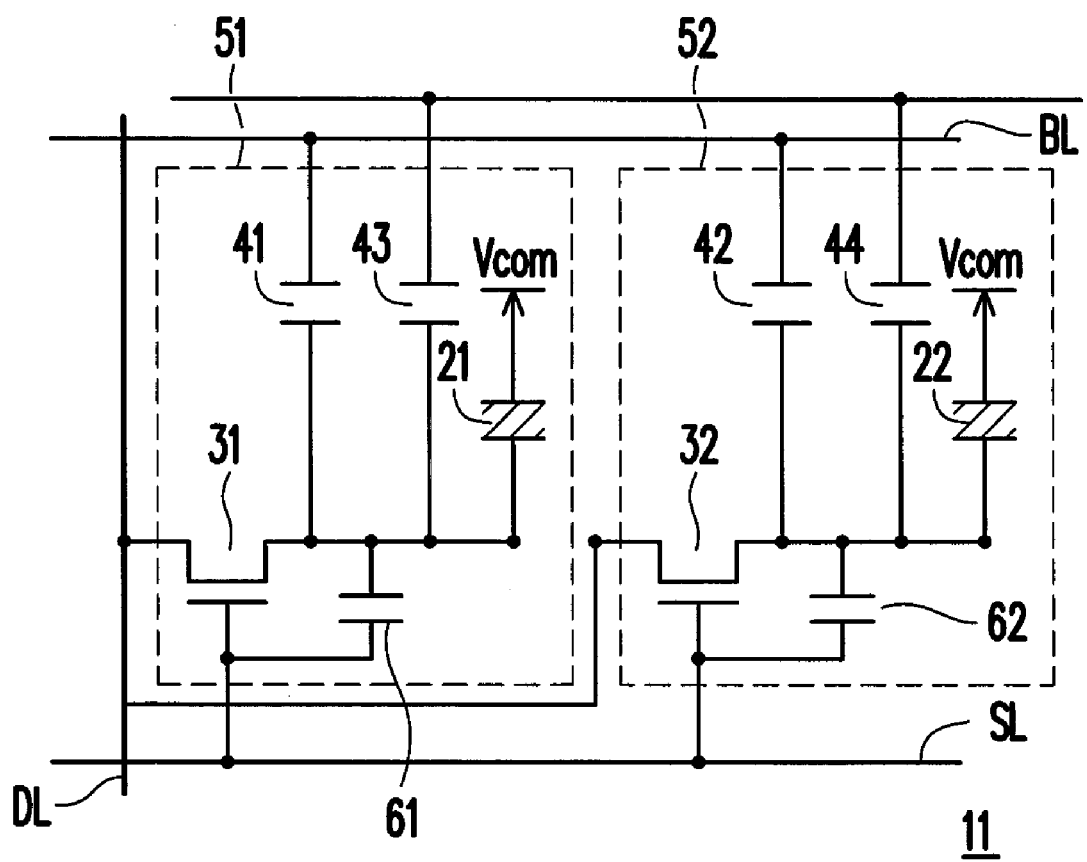
FIG. 5 illustrates a circuit diagram of a pixel of a LCD according to the second embodiment of the present invention.

FIG. 5 illustrates a circuit diagram of a pixel of a LCD according to the second embodiment of the present invention. A pixel 11 in this embodiment is similar to the pixel 10 in the above embodiment, and the descriptions of the elements with the same reference numbers as in FIG. 1 may be referred to in the above embodiment. It is noted that the pixel 11 in this embodiment further includes storage capacitors 43 and 44. A first terminal and a second terminal of the storage capacitor 43 are respectively coupled to the first terminal of the transistor 31 and the second bias electrode. A first terminal and a second terminal of the storage capacitor 44 are respectively coupled to the first terminal of the transistor 32 and the second bias electrode. According to this embodiment, the second bias electrode is coupled to a constant voltage source and the first bias electrode is coupled to the $V_{com}$, for instance. When the common voltage $V_{com}$ is modulated, the changed voltage $\Delta V_{P1}$ of the pixel capacitor 21 and the changed voltage $\Delta V_{P2}$ of the pixel capacitor 22 may be obtained based on the following formulas (III) and (IV):

$$\Delta V_{p1} = \frac{C_{st3} + C_{lc1}}{C_{st1} + C_{st3} + C_{lc1} + C_{gs1}} \times \Delta V_{com} \quad \text{formula (III)}$$

$$\Delta V_{p2} = \frac{C_{st4} + C_{lc2}}{C_{st2} + C_{st4} + C_{lc2} + C_{gs2}} \times \Delta V_{com} \quad \text{formula (IV)}$$

According to the formulas (III) and (IV), $C_{lc1}$ and $C_{lc2}$ respectively represent the liquid crystal capacitances of the pixel capacitors 21 and 22. $C_{st1}$, $C_{st2}$, $C_{st3}$, and $C_{st4}$ represent the storage capacitances of the storage capacitors 41, 42, 43, and 44. $C_{gs1}$ and $C_{gs2}$ represent the parasitical capacitances of the parasitical capacitors 61 and 62, and $\Delta V_{com}$ ($V_{com1}$-$V_{com2}$ or $V_{com2}$-$V_{com1}$) is a modulating value of the common voltage $V_{com}$.

According to the above, this embodiment not only achieves effects similar to the above embodiment but also enhances the stability of the pixel voltage by using the storage capacitors 43 and 44. The circuit design is therefore more flexible. A pixel structure for realizing this embodiment is provided below for reference.

Figure 6A:
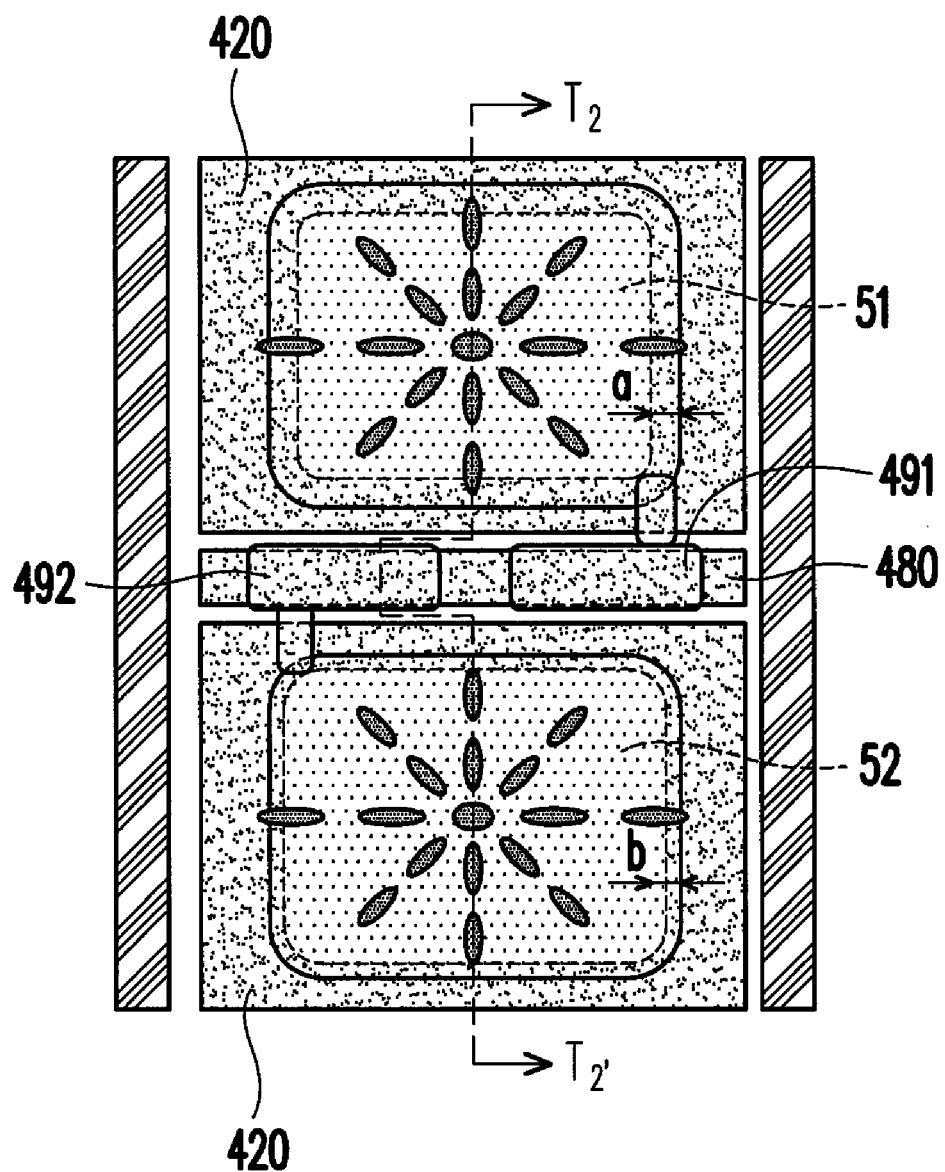
FIG. 6A illustrates a top view of a pixel structure according to the second embodiment of the present invention.
Figure 6B:
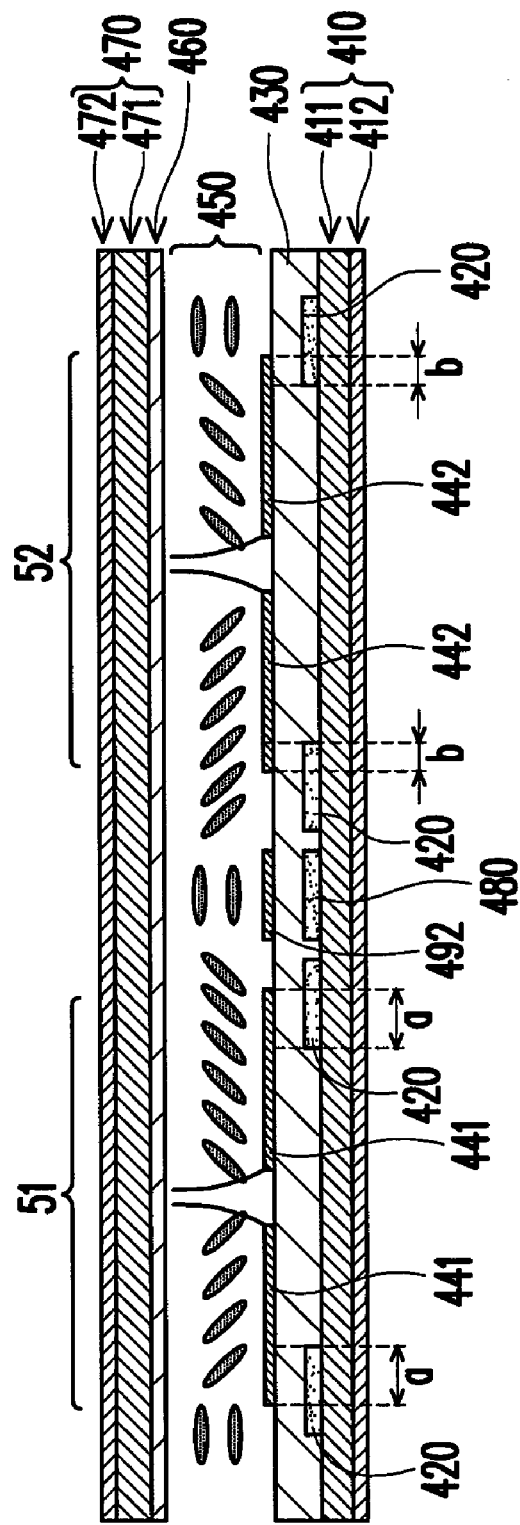
FIG. 6B illustrates a cross-sectional view along the line $T_2$-$T_{2'}$ in FIG. 6A.

FIG. 6A illustrates a top view of a pixel structure according to the second embodiment of the present invention. FIG. 6B illustrates a cross-sectional view along the line $T_2$-$T_{2'}$ in FIG. 6A. Please refer to FIG. 5 together with FIGS. 6A and 6B. The structure of the pixel 11 in this embodiment is similar to the structure of the pixel 10 in the above embodiment, and the descriptions of the elements with the same reference numbers as in FIGS. 4A and 4B may be referred to in the above embodiment. It is noted that a structure of the pixel 11 in this embodiment further includes a common electrode 480. The common electrode 480 is disposed between a portion of the substrate 410 and the dielectric layer 430. A partial area of the common electrode 480 overlaps a partial area 491 of the pixel electrode 441 to form the storage capacitor 43, and a partial area of the common electrode 480 overlaps a partial area 492 of the pixel electrode 442 to form the storage capacitor 44.

In this embodiment, the partial area 491 is designed to be equal to the partial area 492, and thus $C_{st3} = C_{st4}$. However, in another embodiment, the partial area 491 may be designed to be unequal to the partial area 492, such that $C_{st3} \neq C_{st4}$. Consequently, the changed voltages of the pixel capacitors 21 and 22 would be different when the common voltage $V_{com}$ is modulated.

Third Embodiment

Figure 7:
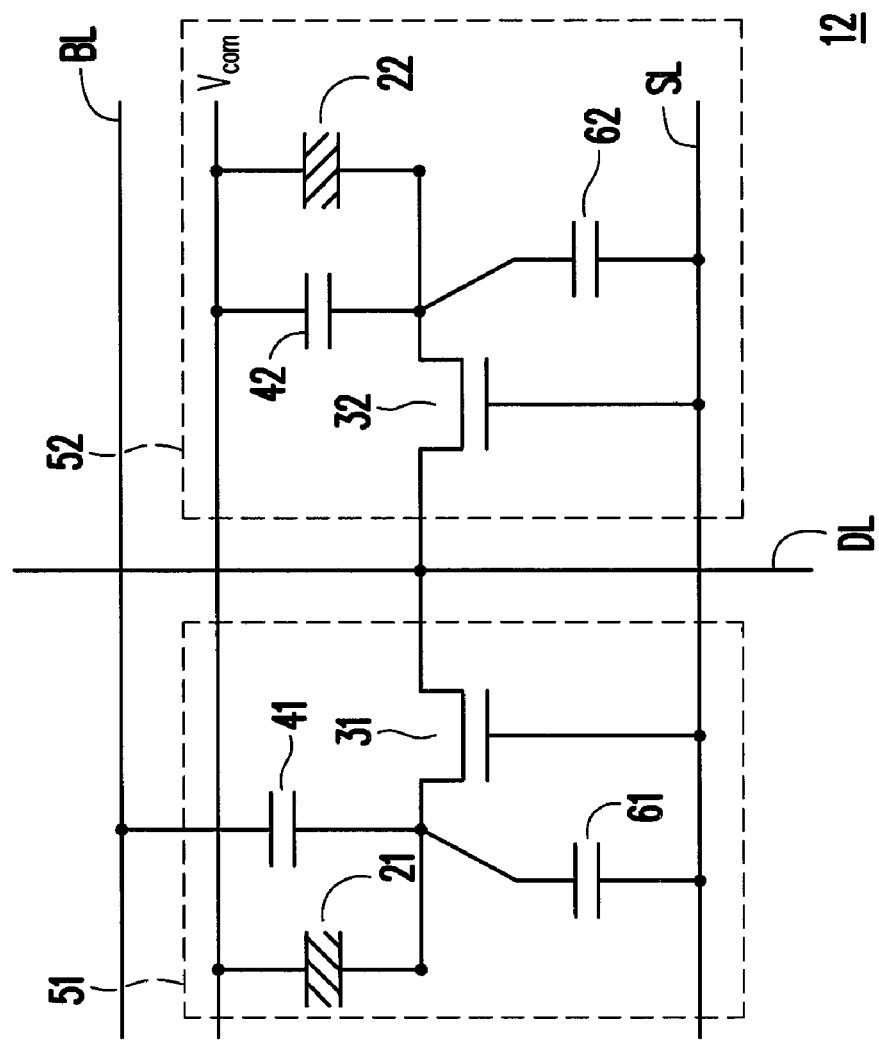
FIG. 7 illustrates a circuit diagram of a pixel of a LCD according to the third embodiment of the present invention.

Persons having ordinary knowledge in the art may vary the structure of a pixel according to their requirements. For instance, FIG. 7 illustrates a circuit diagram of a pixel of a LCD according to the third embodiment of the present invention. A pixel 12 in this embodiment is similar to the pixel 10 as shown in FIG. 3A, and the descriptions of the elements with the same reference numbers may be referred to in the above embodiments. The storage capacitor 42 and the pixel capacitor 22 of the pixel 12 are designed to be connected in parallel. Therefore, this embodiment also achieves the effects similar to the above embodiments.

Fourth Embodiment

Figure 8A:
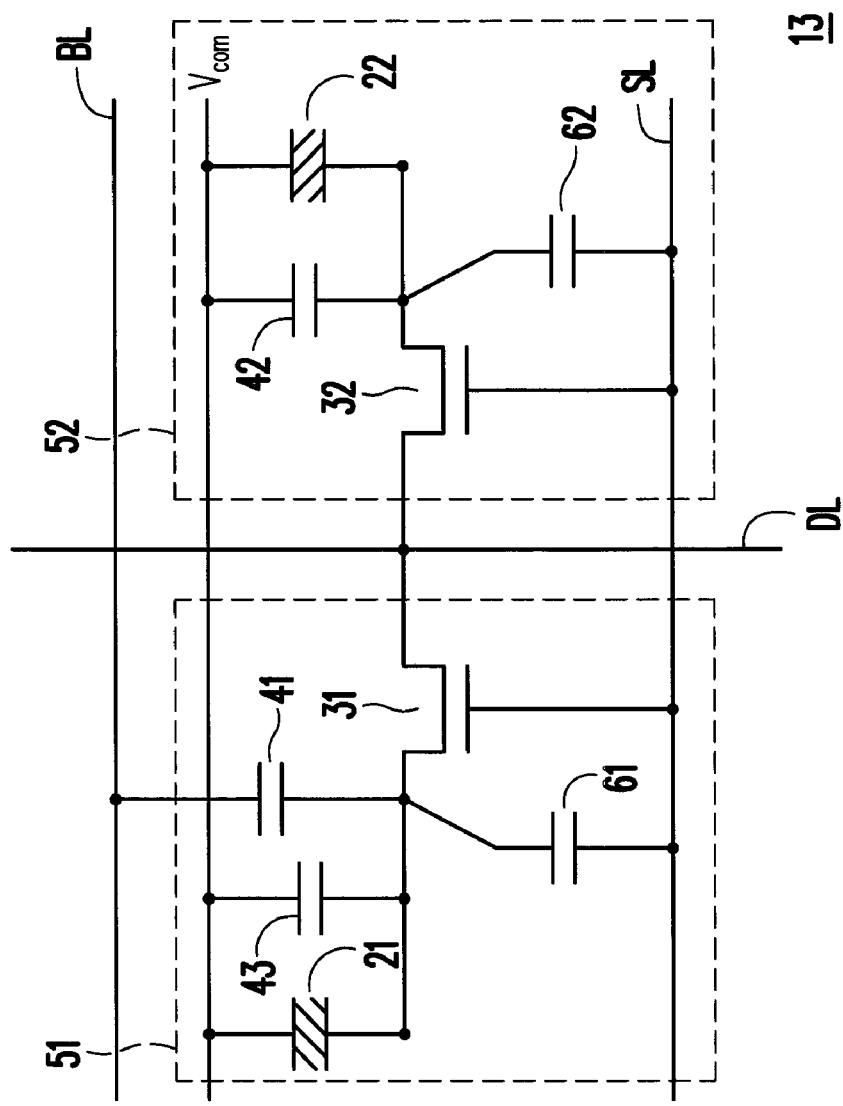
FIG. 8A illustrates a circuit diagram of a pixel of a LCD according to the fourth embodiment of the present invention.

Moreover, persons having ordinary knowledge in the art may add various numbers of storage capacitors to be connected in parallel with each pixel capacitor, so as to meet their requirements. FIG. 8A illustrates a circuit diagram of a pixel of a LCD according to the fourth embodiment of the present invention. A pixel 13 in this embodiment is similar to the pixel 12 as shown in FIG. 7, and the descriptions of the elements with the same reference numbers may be referred to in the above embodiment. It should be noted that, in this embodiment, the storage capacitor 43 is added to be connected in parallel with the pixel capacitor 21. Hence, this embodiment not only achieves the effects similar to the above embodiments but also increases the flexibility in designing the circuit.

Figure 8B:
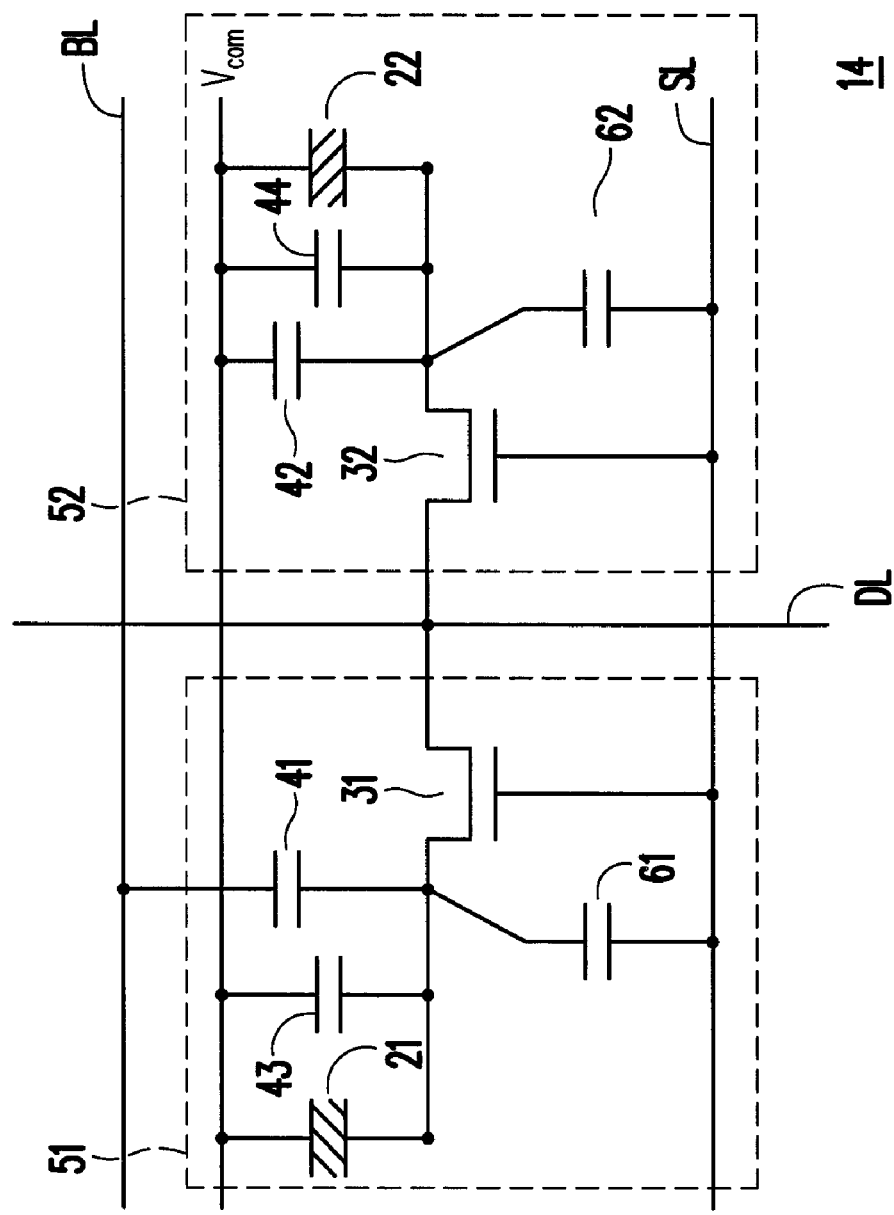
FIG. 8B illustrates a circuit diagram of another pixel of the LCD according to the fourth embodiment of the present invention.

Moreover, FIG. 8B illustrates a circuit diagram of another pixel of the LCD according to the fourth embodiment of the present invention. A pixel 14 in this embodiment is similar to the pixel 13 shown in FIG. 8A, and the descriptions of the elements with the same reference numbers may be referred to in the above embodiments.

It should be noted that, in this embodiment, the storage capacitor 44 is added to be connected in parallel with the pixel capacitor 22. Hence, this embodiment not only achieves the effects similar to the above embodiments but also increases the flexibility in designing the circuit.

To conclude, the present invention modulates the common voltage to differentiate the changed voltages of the pixel capacitors 21 and 22, and thereby improves the color wash-out phenomenon.

Although the present invention has been disclosed by the above embodiments, they are not intended to limit the present invention. Any persons having ordinary knowledge in this art may make modifications and variations without departing from the spirit and scope of the present invention. Therefore, the protection range of the present invention falls in the appended claims.

What is claimed is:

1. A liquid crystal display (LCD), comprising:
   a substrate and an opposite substrate corresponding to the substrate;
   a bias electrode and a common electrode, disposed on the substrate;
   a first pixel electrode, partially overlapping the bias electrode and the common electrode to respectively form a first storage capacitor having a capacitance $C_{st1}$ and a third storage capacitor having a capacitance $C_{st3}$;
   a second pixel electrode, partially overlapping the bias electrode and the common electrode to respectively form a second storage capacitor having a capacitance $C_{st2}$ and a fourth storage capacitor having a capacitance $C_{st4}$; and
   a mutual electrode, disposed on the opposite substrate and respectively overlapping the first pixel electrode and the second pixel electrode to form a first pixel capacitor having a capacitance $C_{lc1}$ and a second pixel capacitor having a capacitance $C_{lc2}$, wherein $$\frac{C_{st3} + C_{lc1}}{C_{st1} + C_{st3} + C_{lc1}} \neq \frac{C_{st4} + C_{lc2}}{C_{st2} + C_{st4} + C_{lc2}}.$$

2. The liquid crystal display according to claim 1, wherein an overlap area of the first pixel electrode and the bias electrode is different from an overlap area of the second pixel electrode and the bias electrode.

3. The liquid crystal display according to claim 1, wherein an overlap area of the first pixel electrode and the common electrode is different from an overlap area of the second pixel electrode and the common electrode.

4. The liquid crystal display according to claim 1, wherein an overlap area of the mutual electrode and the first pixel electrode is different from an overlap area of the mutual electrode and the second pixel electrode.

5. The liquid crystal display according to claim 1, wherein the bias electrode and the common electrode are formed in one piece.

6. The liquid crystal display according to claim 5, wherein the capacitance $C_{st3}$ of the third storage capacitor is 0, and the capacitance $C_{st4}$ of the fourth storage capacitor is also 0.

7. The liquid crystal display according to claim 1, wherein the bias electrode has a first opening and a second opening.

8. The liquid crystal display according to claim 7, wherein the first pixel electrode corresponds to the first opening.

9. The liquid crystal display according to claim 7, wherein the second pixel electrode corresponds to the second opening.

10. The liquid crystal display according to claim 1, wherein the first pixel electrode has a third opening.

11. The liquid crystal display according to claim 10, wherein the third opening is in a central position of the first pixel electrode.

12. The liquid crystal display according to claim 1, wherein the second pixel electrode has a fourth opening.

13. The liquid crystal display according to claim 12, wherein the fourth opening is in a central position of the second pixel electrode.

14. The liquid crystal display according to claim 1, wherein the first pixel electrode is a transparent electrode, and the second pixel electrode is an opaque electrode.

* * * * *